US012785180B2

(12) United States Patent
Park et al.

(10) Patent No.: US 12,785,180 B2
(45) Date of Patent: Nov. 3, 2026

(54) BASE MATERIAL ASSEMBLY FOR MECHANICAL AND ELECTRICAL CONNECTION, AND RIVETING METHOD THEREFOR

(71) Applicant: LG ENERGY SOLUTION, LTD., Seoul (KR)

(72) Inventors: Heung Kun Park, Daejeon (KR); Choon Kwon Kang, Daejeon (KR); Jun Beom Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 805 days.

(21) Appl. No.: 17/925,524

(22) PCT Filed: Jul. 28, 2021

(86) PCT No.: PCT/KR2021/009837
§ 371 (c)(1),
(2) Date: Nov. 15, 2022

(87) PCT Pub. No.: WO2022/025645
PCT Pub. Date: Feb. 3, 2022

(65) Prior Publication Data

US 2023/0198060 A1 Jun. 22, 2023

(30) Foreign Application Priority Data

Jul. 28, 2020 (KR) ........................ 10-2020-0093609

(51) Int. Cl.
*H01M 50/124* (2021.01)
*H01R 4/06* (2006.01)
*H01R 4/26* (2006.01)

(52) U.S. Cl.
CPC ............ *H01M 50/124* (2021.01); *H01R 4/06* (2013.01); *H01R 4/26* (2013.01)

(58) Field of Classification Search
CPC .......... H01R 4/06; H01R 4/26; H01M 50/124
(Continued)

(56) References Cited

U.S. PATENT DOCUMENTS 8,366,495 B2 * 2/2013 Nagy ..................... H01R 4/304
439/783
8,783,998 B2 * 7/2014 Geislinger ................ F16B 5/02
403/337
(Continued)

FOREIGN PATENT DOCUMENTS

CN 102332644 A 1/2012
CN 204441381 U 7/2015
(Continued)

OTHER PUBLICATIONS

JP-2014132547-A, Wakatsuki Yutaka et al. translation—(Year: 2014).*
(Continued)

*Primary Examiner* — Tulsidas C Patel
*Assistant Examiner* — Thaslimur Rahman
(74) *Attorney, Agent, or Firm* — Birch, Stewart, Kolasch & Birch, LLP

(57) ABSTRACT

The present disclosure relate to a base material assembly including a first base material made of a conductive material, a second base material made of a conductive material, spaced apart from the first base material to face the first base material, and coupled with the first base material by riveting, a plurality of emboss members each protruding from an inside surface of the second base material to point-contact a plane of an inside surface of the first member, and the first base material and the second base material are mechanically and electrically connected through the plurality of emboss members.

15 Claims, 5 Drawing Sheets

(58) Field of Classification Search
USPC .......................................................... 439/781
See application file for complete search history.

(56) References Cited

U.S. PATENT DOCUMENTS

| | | | | |
|---|---|---|---|---|
| 11,145,937 | B2 | 10/2021 | Yang et al. | |
| 2004/0063352 | A1* | 4/2004 | Egitto | H05K 3/4007 439/482 |
| 2010/0233915 | A1* | 9/2010 | Kim | H01M 50/567 439/754 |
| 2011/0129718 | A1 | 6/2011 | Lee | |
| 2014/0065467 | A1 | 3/2014 | Choi et al. | |
| 2015/0041211 | A1* | 2/2015 | Debock | H01R 4/62 174/126.3 |
| 2015/0221924 | A1 | 8/2015 | Lee | |
| 2016/0325341 | A1 | 11/2016 | Gostylla et al. | |
| 2017/0104247 | A1 | 4/2017 | Son | |
| 2020/0144572 | A1 | 5/2020 | Lee et al. | |

FOREIGN PATENT DOCUMENTS

| | | | |
|---|---|---|---|
| CN | 109428039 | A | 3/2019 |
| DE | 19600417 | A1 | 7/1997 |
| JP | 61-83001 | U | 6/1986 |
| JP | 8-213068 | A | 8/1996 |
| JP | 2002-93489 | A | 3/2002 |
| JP | 2002-155910 | A | 5/2002 |
| JP | 2004-297021 | A | 10/2004 |
| JP | 2005-123007 | A | 5/2005 |
| JP | 2014-132547 | A | 7/2014 |
| JP | 2016-45984 | A | 4/2016 |
| JP | 2017-130287 | A | 7/2017 |
| KR | 10-2010-0105340 | A | 9/2010 |
| KR | 10-2013-0080023 | A | 7/2013 |
| KR | 10-1329250 | B1 | 11/2013 |
| KR | 10-2016-0016363 | A | 2/2016 |
| KR | 10-2016-0033528 | A | 3/2016 |
| KR | 10-2016-0049889 | A | 5/2016 |
| KR | 10-2016-0106129 | A | 9/2016 |
| KR | 10-2017-0042066 | A | 4/2017 |
| KR | 10-2018-0078041 | A | 7/2018 |
| KR | 10-2019-0110402 | A | 9/2019 |
| KR | 10-2020-0052736 | A | 5/2020 |

OTHER PUBLICATIONS

CN-109428039-A, Satou, Kitsunori translation (Year: 2019).*

Extended European Search Report for European Application No. 21849982.0, dated Jan. 30, 2024.

International Search Report (PCT/ISA/210). issued in PCT/KR2021/009837, mailed Nov. 19, 2021.

* cited by examiner

320 : 321, 322, 323

BASE MATERIAL ASSEMBLY FOR MECHANICAL AND ELECTRICAL CONNECTION, AND RIVETING METHOD THEREFOR

CROSS REFERENCE TO RELATED APPLICATIONS

This application is the National Phase of PCT/KR2021/009837 filed on Jul. 28, 2021, which claims priority under 35 U.S.C. § 119(a) to Patent Application No. 10-2020-0093609 filed in the Republic of Korea on Jul. 28, 2020, all of which are hereby expressly incorporated by reference into the present application.

TECHNICAL FIELD

The present disclosure relates to a base material assembly for a mechanical and electrical connection and a riveting method thereof, and more particularly, to a base material assembly capable of reducing a quality deviation when a plurality of base materials are mechanically and electrically connected and a riveting method thereof.

BACKGROUND ART

As technical development and demands for a mobile device are increasing, demands for rechargeable secondary battery as an energy source are rapidly increasing. Thus, a lot of researches on the secondary battery capable of meeting various demands have been conducted. Also, the secondary battery has received attention as a power source of a medium and large-sized device such as an electric vehicle, a hybrid electric vehicle, and a plug-in hybrid electric vehicle.

When the secondary battery is used for the medium and large-sized device that requires a large capacity, a battery pack type secondary battery in which a plurality of battery cells are arranged is used to satisfy the output and the capacity required in the medium and large-sized device.

A riveting method is one of connection methods used in a mechanical and electrical connection between a medium and large-sized device and a battery pack mounted thereto, a mechanical and electrical connection between battery packs mounted to the medium and large-sized device, and a mechanical and electrical connection between battery cells in the battery pack.

Here, a contact area of a portion connected by the riveting method may be easily varied according to a working environment such as a position and a rivet direction of a riveting gun and a proficiency of a worker. Here, the contact area of the connected portion relates to a resistance, and thus a resistance deviation of the connected portion, which is generated as the contact area of the connected portion is varied reaches about 10%.

Thus, the contact area is required to be inspected to reduce a quality deviation of the connected portion after the mechanical and electrical connection by the riveting method is performed. However, since the portion connected by the riveting method is in a surface-contact state, the portion may not be inspected with naked eyes.

The background technology of the present disclosure is disclosed in patent documents below.

(Patent document 1) KR10-2013-0080023 A (Patent document 2) KR10-1329250 B1

DISCLOSURE OF THE INVENTION

Technical Problem

The present disclosure provides a base material assembly capable of reducing a quality deviation of a contact area and a resistance deviation related thereto when base materials are mechanically and electrically connected to each other and a riveting method thereof.

Technical Solution

In accordance with an exemplary embodiment, a base material assembly includes: a first base material; a second base material, spaced apart from the first base material to face the first base material, and coupled with the first base material by a rivet member; a plurality of emboss members protruding from an inside surface of the second base material to point-contact a plane of an inside surface of the first member. The first base material and the second base material are spaced apart in parallel from each other. Here, the first base material and the second base material are mechanically and electrically connected through the plurality of emboss members.

The plurality of emboss members are spaced apart from each other in a transverse direction and a longitudinal direction.

The plurality of emboss members may be spaced apart from each other to be symmetric with respect to the rivet member coupled the first base material and the second base material.

The plurality of emboss members may protrude from the second base material by a predetermined height within an error range.

Each of the plurality of emboss members may have a semi-spherical shaped surface contacting the second base material.

The plurality of emboss members may be made of the same material as the first base material.

The plurality of emboss members are made of a material different from that of the second base material.

In accordance with another exemplary embodiment, a riveting method of a base material assembly includes: preparing a first base material; preparing a second base material; forming a plurality of emboss members on the second base material; spacing apart the first base material from the second base material so that a surface of the first base material faces a surface of the second base material on which the plurality of emboss members are formed; moving the first base material toward the second base material so that the plurality of emboss members point-contact a plane of the surface of the first base material; and coupling the first base material to the second base material by riveting. Here, the coupling of the first base material and the second base material mechanically and electrically connects the first base material to the second base material through the plurality of emboss members.

The preparing of the first base material can include forming a first through-hole for receiving a rivet member, the preparing of the second base material can include forming a second through-hole in a location corresponding to the first through-hole for receiving the rivet member, and the plurality of emboss members can be spaced apart from the second through-hole in a transverse direction and a longitudinal direction and protrude from the second base material by a predetermined height.

The riveting method may further include, after the coupling of the first base material and the second base material, checking a contact state between the plurality of emboss members and the first base material through a space between the first base material and the second base material; and determining whether a defect is generated in the riveting of the first base material and the second base material based on a result obtained by the checking.

Advantageous Effects

In accordance with the exemplary embodiment, one pair of base materials are joined by the riveting method such that the emboss members are formed on the inside surface of one of the one pair of base materials to be mechanically and electrically connected, and the inside surface of the other is allowed to be the flat surface. Thus, the emboss members and the flat surface may contact in the point-to-surface manner unlike the typical method. Thus, the quality deviation of the contact area between the one pair of base materials, which is affected by the difference between working environments, and the resistance deviation related thereto may be reduced in comparison with the typical method of contacting a flat surface and a flat surface in a surface-to-surface manner. Also, since the space between the one pair of base materials may be secured by using the emboss members after the base materials are joined, the contact state between the one pair of base materials may be easily determined by the naked eyes.

DETAILED DESCRIPTION OF EMBODIMENTS

Figure 1:
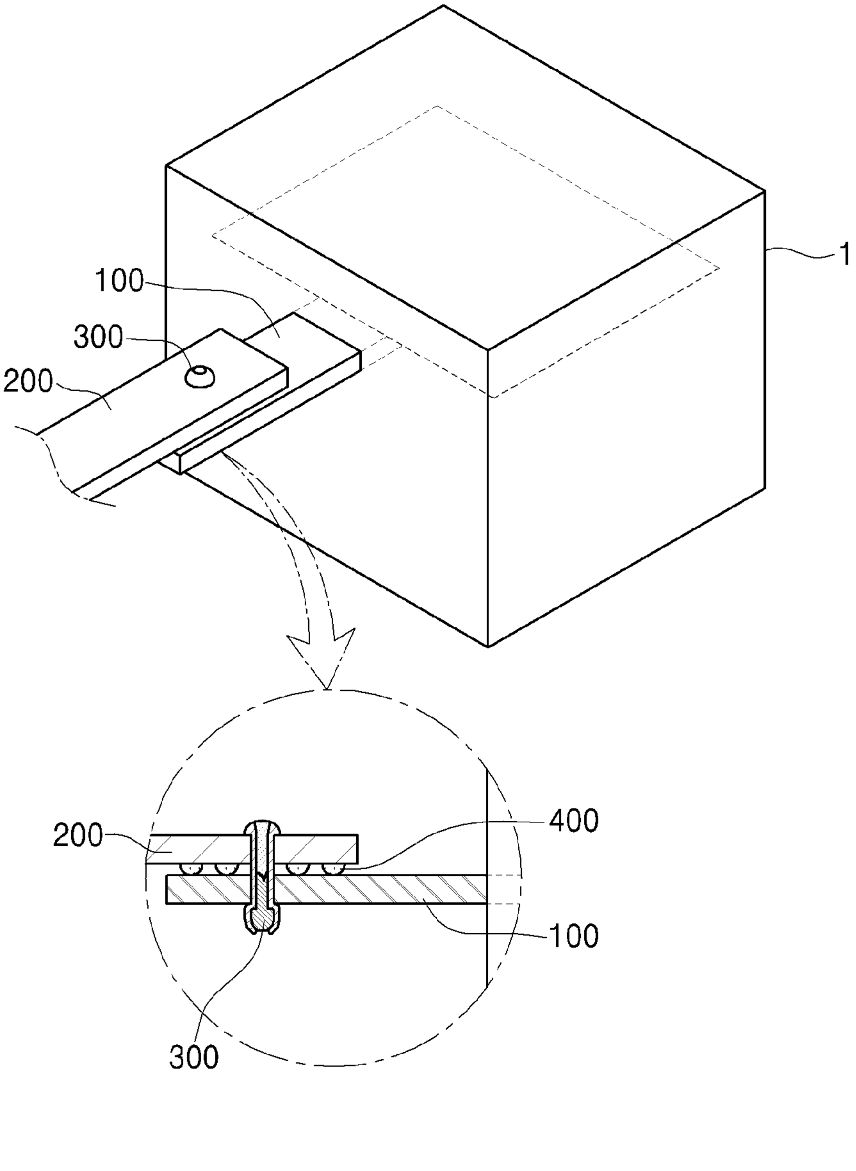
FIG. 1 is a schematic view of a base material assembly in accordance with an exemplary embodiment.

Hereinafter, embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration, and parts irrelevant to the description are omitted in order to clearly describe the present invention. Like reference numerals refer to like elements throughout.

Hereinafter, embodiments of the inventive concept will be described with reference to the accompanying drawings.

1. Base Material Assembly for Mechanical and Electrical Connection in Accordance with an Exemplary Embodiment FIG. 1 is a schematic view of a base material assembly in accordance with an exemplary embodiment. The base material assembly for the mechanical and electrical connection in accordance with an exemplary embodiment will be described in detail with reference to FIG. 1.

The base material assembly in accordance with an exemplary embodiment, which is a base material assembly for a mechanical and electrical connection between a first object 1 and a second object, includes following components.

1.1. First Base Material 100

A first base material 100 may be made of a conductive material. That is, the first base material 100 may be made of a metal material having a high electrical conductivity.

The first base material 100 may be provided to the first object 1 or connected with the first object 1. The first object 1 may be a batter cell or a battery pack. For example, the first base material 100 may be integrated with or connected with an electrode terminal of a battery cell or a bus bar of a battery pack. Alternatively, the kind of the first object 1 may be variously changed.

Figure 2:
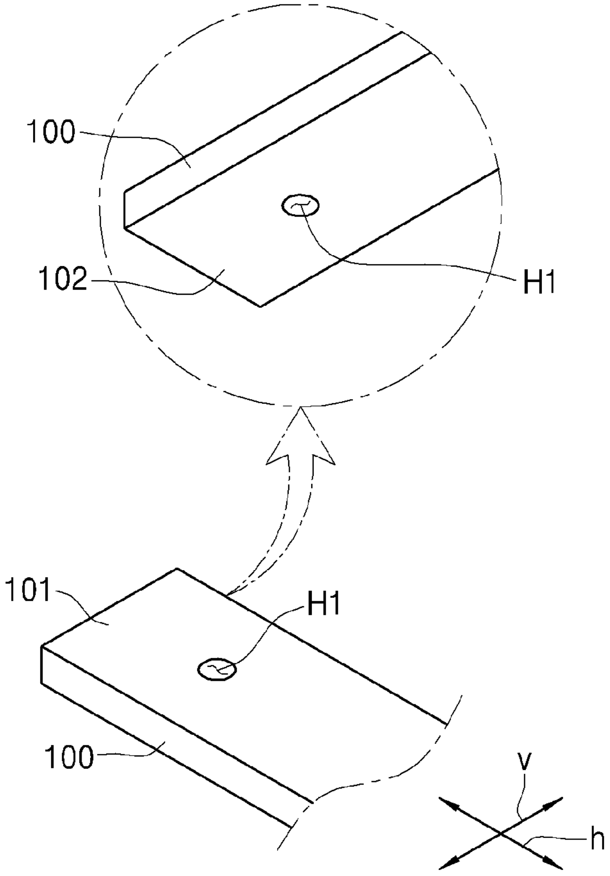
FIG. 2 is a schematic view of a first base material in accordance with an exemplary embodiment.

FIG. 2 is a schematic view of the first base material in accordance with an exemplary embodiment.

Referring to FIG. 2, the first base material 100 may have a rectangular plate shape in which a length in a transverse direction h is greater than a length in a longitudinal direction v and which has a predetermined thickness in a vertical direction. Also, one surface 101 of the first base material 100, which faces a second base material 200, may have a flat surface shape. The one surface 101 of the first base material 100 may be referred to as an inside surface or a top surface. Also, the other surface 102 of the first base material 100 may have various shapes. For example, the other surface 102 of the first base material 100 may have a flat surface shape. The other surface 102 of the first base material 100 may be referred to as an outside surface or a bottom surface.

1.2. First Through-Hole H1

A first through-hole H1 may pass through the first base material 100 in a vertical direction. Here, the vertical direction may be a direction crossing the longitudinal direction v and the transverse direction h. A rivet member 300 may be disposed in the first through-hole H1.

1.3. Second Base Material 200

A second base material 200 may be made of a conductive material. That is, the second base material 100 may be made of a metal material having a high electrical conductivity. Here, the second base material 200 may be made of the same material as the first base material 100. Alternatively, the second base material 200 may be made of a material that has an electrical conductivity but is different from that of the first base material 100.

The second base material 200 may be provided to the second object or connected with the second object. Here, the second object may be a surrounding battery cell or a surrounding battery pack to be mechanically and electrically connected with the first object 1. Alternatively, the second object may be a circuit board of a power unit of a small-sized or medium and large sized device to be mechanically and electrically connected with the first object 1. The second base material 200 may be integrated with or connected with an electrode terminal of a surrounding battery cell, a bus bar of a surrounding battery pack, or a circuit board of a power unit. Alternatively, the kind of the second object may be variously changed.

Figure 3:
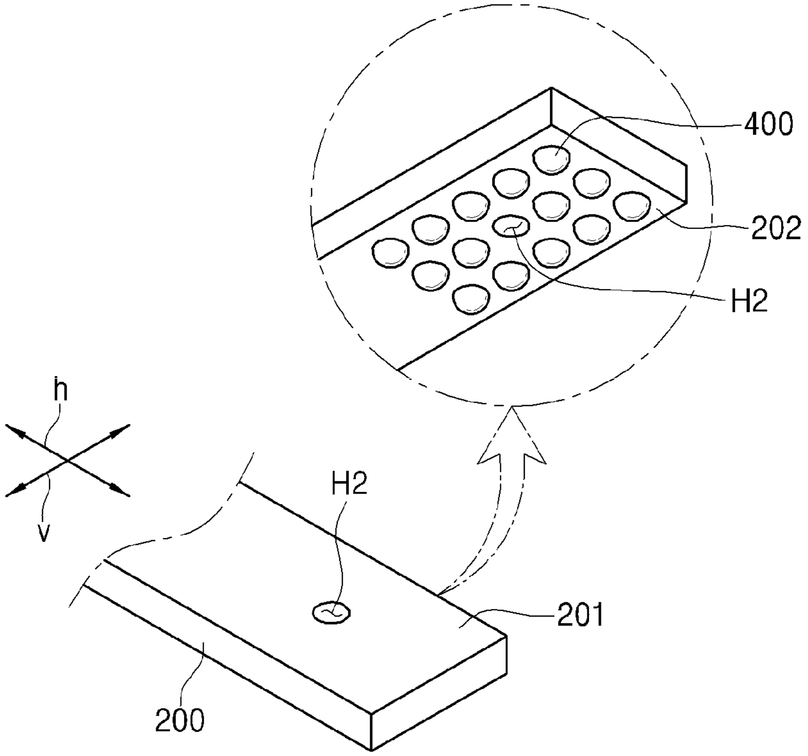
FIG. 3 is a schematic view of a second base material and an emboss member in accordance with an exemplary embodiment.

FIG. 3 is a schematic view illustrating a second base material and an emboss member in accordance with an exemplary embodiment.

Referring to FIG. 3, the second base material 200 may have a rectangular plate shape in which a length in a transverse direction h is greater than a length in a longitudinal direction v and which has a predetermined thickness in the vertical direction. Also, the other surface 202 of the second base material 200, which faces the first base material 100 in the vertical direction, may have a flat surface shape. The other surface 202 of the second base material 200 may be referred to as an inside surface or a bottom surface. Also, one surface 201 of the second base material 200 may have various shapes. For example, the one surface 201 of the second base material 200 may have a flat surface shape. The one surface 201 of the second base material 200 may be referred to as an outside surface or a top surface.

The second base material 200 may be spaced apart from the first base material 100 to face the first base material 100 and coupled with the first base material 100 by riveting. That is, the other surface 202 of the second base material 200 and the one surface 101 of the first base material 100 may be spaced by a predetermined height in the vertical direction from each other by a plurality of emboss members 400.

1.4. Second Through-Hole H2

A second through-hole H2 may pass through the second base material 200 in the vertical direction. A rivet member 300 may be disposed in the second through-hole H2. Here, the second through-hole H2 may correspond to the first through-hole H1. The feature of corresponding represents a feature of being mutually aligned while facing each other in the vertical direction. Also, the second through-hole H2 may be disposed at a center of the plurality of emboss members 400 in the transverse direction h and the longitudinal direction v.

According to an arrangement relationship of the second through-hole H2 and the plurality of emboss members 400, when the first base material 100 and the second base material 200 are riveted, a force of the rivet member 300 pressing the first base material 100 and the second base material 200 in the vertical direction may be evenly distributed to the plurality of emboss members 400.

Thus, the first base material 100 and the second base material 200 may be horizontally spaced apart from each other instead of being inclined to each other, and also the plurality of emboss members 400 may stably and uniformly contact the one surface 101 of the first base material 100.

1.5. Rivet Member 300

The rivet member 300 may pass through the first through-hole H1 and the second through-hole H2 and contact the other surface 102 of the first base material 100 and the one surface 201 of the second base material 200. The rivet member 300 may couple the first base material 100 and the second base material 200 such that a lower end of the rivet member 300 presses upward the other surface 102 of the first base material 100 around the first through-hole H1, and an upper end of the rivet member 300 presses downward the one surface 201 of the second member 200 around the second through-hole H2.

1.6. A Plurality of Emboss Members 400

The plurality of emboss members 400 may protrude from the inside surface 202 of the second base material 200 to point-contact a plane of the inside surface 101 of the first base material 100. Through the plurality of emboss members 400, the first base material 100 and the second base material 200 may be mechanically and electrically connected to each other.

Referring to FIG. 3, the plurality of emboss members 400 may be arranged along the inside surface of the second base material 200, the plurality of emboss members 400 may be spaced apart from each other in the transverse direction h and the plurality of emboss members 400 may be spaced apart from each other the longitudinal direction v. Here, the plurality of emboss members 400 may be spaced apart from each other to be symmetric in the transverse direction h and the longitudinal direction v with respect to the rivet member 300 mounted to couple the first base material 100 and the second base material 200.

Also, each of the plurality of emboss members 400 may protrude from the inside surface 202 of the second base material 200 in the vertical direction. Here, protruding heights of the emboss members 400 in the vertical direction may be equal to each other within an error range.

The error range is a variation degree of a protruding height when it is determined that a variation degree of a protruding height in the transverse direction h and the longitudinal direction v does not affect a variation of a contact area or a contact number between the first base material 100 and the plurality of emboss members 400, and since the error range may be obtained when a riveting operation is repeated, a numerical values of the error range will be omitted.

Each of the plurality of emboss members 400 may have a curved shape in which a surface contacting the first base material 100 protrudes in a direction toward the first base material, e.g., in a downward direction. Specifically, each of the emboss members 400 may have, e.g., a semi-spherical shape in which a bottom surface contacts the first base material 100.

According to the shape of each of the plurality of emboss members 400, when the first base material 100 and the second base material 200 are riveted, the plurality of emboss members 400 may uniformly contact the first base material 100, and the first base material 100 and the second base material 200 may be spaced apart in parallel from each other. Thus, all of the plurality of emboss members 400 may evenly contact the one surface 101 of the first base material 100.

The plurality of emboss members 400 may include the same material as the second base material 200. Alternatively, the plurality of emboss members 400 may include a conductive material different from that of the second base material 200.

That is, when each of the plurality of emboss members 400 is made of the same material as the second base material 200, the second base material 200 and the plurality of emboss members 400 may be easily manufactured.

Also, when each of the plurality of emboss members 400 and the second base material 200 are made of different kinds of materials, each of the plurality of emboss members 400 may be made of a metal material having a resistance less or greater than that of the material of the second base material 200, and thus an overall resistance of the base material assembly may be easily adjusted into a preferred resistance.

Also, each of the plurality of emboss members 400 may be made of a material different from that of the first base material 100. For example, as each of the plurality of emboss members 400 is made of a material softer or stronger than that of the first base material 100, when the first base material 100 and the second base material 200 are riveted, a contact surface between the plurality of emboss members 400 and the first base material 100 may be adjusted in size such that a bottom surface of each of the plurality of emboss members 400 increases in the transverse direction h and the longitudinal direction v by adjusting a riveting strength, or the bottom surface of each of the plurality of emboss members 400 is inserted by a predetermined depth into the inside surface 101 of the first base material 100.

Figure 4:
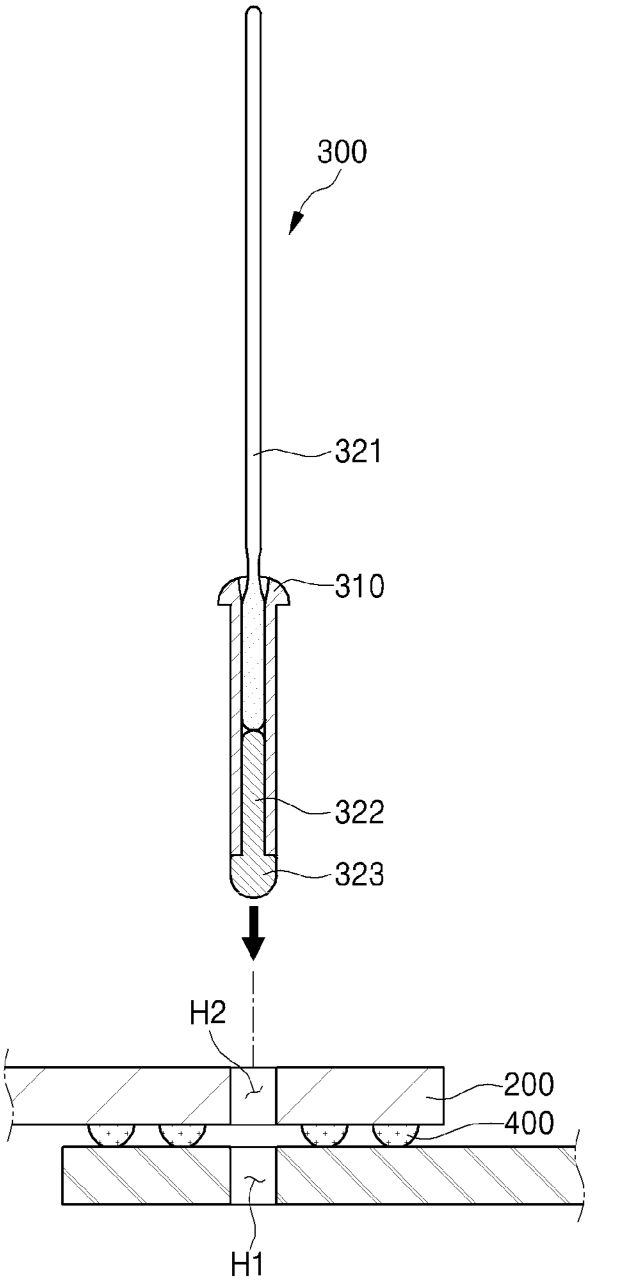
FIG. 4 is a schematic view illustrating a state before the first base material and the second base material are riveted in accordance with an exemplary embodiment.
Figure 5:
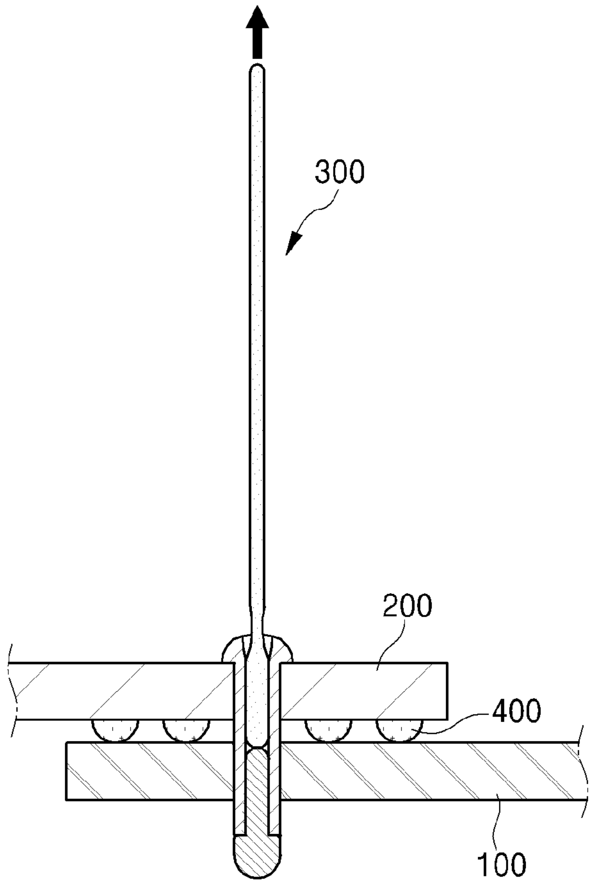
FIG. 5 is a schematic view illustrating a state in which the first base material and the second base material are riveted in accordance with an exemplary embodiment.
Figure 6:
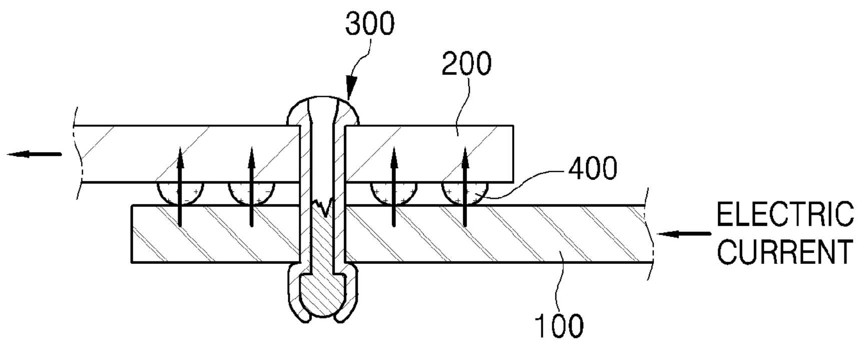
FIG. 6 is a schematic view illustrating a state in which the first base material and the second base material are completely riveted in accordance with an exemplary embodiment.

2. Riveting Method of Base Material Assembly for Mechanical and Electrical Connection in Accordance with an Exemplary Embodiment FIG. 4 is a schematic view illustrating a state before the first base material and the second base material are riveted in accordance with an exemplary embodiment. FIG. 5 is a schematic view illustrating a state in which the first base material and the second base material are riveted in accordance with an exemplary embodiment. FIG. 6 is a schematic view illustrating a state in which the first base material and the second base material are completely riveted in accordance with an exemplary embodiment. A riveting method of a base material assembly will be described in detail with reference to FIGS. 2 to 6. Here, when the riveting method of the base material assembly is described, a feature overlapping the above description of the base material assembly will be omitted or simply described.

The riveting method of the base material assembly in accordance with an exemplary embodiment may include following processes.

2.1. Process of Preparing First Base Material Made of Conductive Material

Referring to FIG. 2, a process of preparing a first base material 100 made of a conductive material prepares the first base material 100 having a plate shape in which one surface 101 to be in contact with a plurality of emboss members 400 has a flat surface shape and form a first through-hole H1 in the first base material 100, through which a rivet member 300 pass through the first base material 100.

Here, the first through-hole H1 may be formed in the first base material 100 connected with a first object 1, or the first base material 100 may be connected with a second object after the first through-hole H1 is formed in the first base material 100.

2.2. Process of Preparing Second Base Material Made of Conductive Material

Referring to FIG. 3, a process of preparing a second base material 200 made of a conductive material prepares the second base material 200 having a plate shape in which the other surface 202 on which the plurality of emboss members 400 are formed has a flat surface shape and form a second through-hole H2 in the second base material 200, through which the rivet member 300 pass through the first base material 100, in correspondence to the first through-hole H1.

Here, the second through-hole H2 is formed in the second base material 200 connected with the second object, or the second base material 200 may be connected with the second object after the second through-hole H2 is formed in the second base material 200.

2.3. Process of Forming a Plurality of Emboss Members on Second Base Material

Referring to FIG. 3, a process of forming the plurality of emboss members 400 on the second base material 200 forms the plurality of emboss members 400 on the other surface 202 of the second base material 200.

Here, as the plurality of emboss members 400 are spaced apart from the second through-hole H2 in the transverse direction h and the longitudinal direction v and protrude by the same height from the second base material 200, the plurality of emboss members 400 may be formed on the other surface 202 of the second base material 200.

A method for forming the plurality of emboss members 400 may include a cutting method, a bonding method, a casting method, and a welding method. For example, a plate member having a first thickness may be prepared, and then the other surface of the plate may be cut to prepare the second base material 200 having a thickness less than the first thickness and the plurality of emboss members 400 integrated with the second base material 200.

2.4. Process of Allowing First Base Material and Second Base Material to be Spaced Apart from Each Other so that the One Surface of First Base Material Faces the Other Surface of Second Base Material A process of allowing the first base material 100 and the second base material 200 to be spaced apart from each other so that the one surface 101 of the first base material 100 faces the other surface 202 of the second base material 200 allows the second base material 200 to be positioned above the one surface 101 of the first base material 100.

Here, the first through-hole H1 and the second through-hole H2 may be aligned in the vertical direction.

2.5. Process of Allowing First Base Material to Approach Second Base Material so that the Plurality of Emboss Members Point-Contact One Surface of First Base Material A process of allowing the first base material to approach the second base material so that the plurality of emboss members point-contact the one surface of the first base material allows the plurality of emboss members 400 to be seated on the one surface 101 of the first base material 100.

Here, referring to FIG. 4, the rivet member 300 may be positioned above the second through-hole H2. For example, the rivet member 300 in a state before riveted may include a hollow rivet body 310 and a mandrel 320. Here, the mandrel 320 may include a mandrel upper portion 321 disposed at an upper portion of the rivet body 310 and protruding upward from the rivet body 310, a mandrel lower portion 322 disposed at a lower portion of the rivet body 310, and a mandrel head 323 protruding downward from the rivet body 310. Alternatively, the rivet member 300 may have various configurations.

In the process of allowing the first base material 100 to approach the second base material 200, as the plurality of emboss members 400 contact the one surface 101 of the first base material 100, the first base material 100 and the second base material 200 may be spaced vertically from each other by the plurality of emboss members 400, and a space may be formed therebetween.

Here, the space between the first base material 100 and the second base material 200 may be maintained in the riveting process and then used in a process of checking a contact state between the first base material 100 and the plurality of emboss members 400.

2.6. Process of Coupling First Base Material and Second Base Material by Riveting Referring to FIGS. 5 and 6, a process of coupling the first base material 100 and the second base material 200 by riveting may include a process of arranging the rivet member 300 in the first and second through-holes H1 and H2 and a process of coupling the first base material 100 and the second base material 200 by pulling upward the mandrel of the rivet member 300 to deform the rivet body of the rivet member 300 and pressing upward the first base material 100 and pressing downward the second base material 200.

Here, referring to FIG. 6, the first base material 100 and the second base material 200 may be mechanically and electrically connected through the plurality of emboss members 400.

2.7. Process of Checking Contact State Between the Plurality of Emboss Members and First Base Material Through Spaced Space Between First Base Material and Second Base Material, and Process of Determining Whether Defect is Generated in Riveting of First Base Material and Second Base Material Based on Result Obtained by the Process of Checking A process of checking a contact state between the plurality of emboss members 400 and the first base material 100 may be performed after the process of coupling the first base material 100 and the second base material 200 by the riveting. The process of checking the contact state may be directly performed such that an operation measures the spaced space between the first base material 100 and the second base material 200 with eyes or performed by photographing an image the plurality of emboss members 400 and the one surface 101 of the first base material 100 between the spaced space between the first base material 100 and the second base material 200 by using an optical instruments and analyzing the photographed image by using a computer.

A process of determining whether a defect of the riveting is generated may check a contact area between the plurality of emboss members 400 and the one surface 101 of the first base material 100 or check the number of the plurality of emboss members 400 contacting the one surface 101 of the first base material 100 to determine that the riveting is satisfactory when the contact area is within a reference area or the contact number is within a reference number. Also, when the contact area is under the reference area or the contact number is short from the reference number, the riveting may be determined as a failure.

The base material assembly and the riveting method thereof in accordance with an exemplary embodiment allow the emboss member to point-contact the base material, thereby reducing a quality deviation in case of contacting and allow the two base materials to be spaced apart from each other by the emboss member, thereby easily inspecting the contact state between the emboss member and the base material.

Although the base material assembly and the riveting method thereof have been described with reference to the specific embodiments, they are not limited thereto. Further, the above contents just illustrate and describe preferred embodiments of the present invention and the present invention may be used under various combinations, changes, and environments. Therefore, it will be readily understood by those skilled in the art that various modifications and changes can be made thereto without departing from the spirit and scope of the present invention defined by the appended claims.

DESCRIPTION OF SYMBOLS

100: First base material
200: Second base material
300: Rivet member
400: A plurality of emboss members

What is claimed is:

1. A base material assembly comprising:
- a first base material;
- a second base material, spaced apart from the first base material to face the first base material, and coupled with the first base material by a rivet member; and
- a plurality of emboss members protruding from an inside surface of the second base material to point-contact a plane of an inside surface of the first base material,
- wherein the first base material and the second base material are spaced apart in parallel from each other,
- wherein the first base material is mechanically and electrically connected to the second base material through the plurality of emboss members,
- wherein each of the plurality of emboss members are separately located on the inside surface of the second base material,
- wherein each of the plurality of emboss members has a semi-spherical shaped surface contacting the first base material, and
- wherein the plurality of emboss members include:
  - a first plurality of emboss members surrounding the rivet member with respect to a longitudinal direction of the second base material; and
  - a second plurality of emboss members surrounding the rivet member with respect to a transverse direction of the second base material.

2. The base material assembly of claim 1, wherein the plurality of emboss members are made of the same material as the second base material.

3. The base material assembly of claim 1, wherein the plurality of emboss members are made of a material different from the second base material.

4. The base material assembly of claim 1, wherein the plurality of emboss members surround a through hole in the second base material with respect to a longitude and traverse direction of the second base material, and
- wherein a number of emboss members of the plurality of emboss members between the through hole in the second base material and an end of the second base material is greater than a number of emboss members of the plurality of emboss members between the through hole and a side of the second base material.

5. The base material assembly of claim 1, wherein the rivet member includes a head that contacts the second base material.

6. The base material assembly of claim 1, wherein a thickness of the rivet member on an upper surface of the second base material is approximately the same as a thickness of the rivet member on a lower surface of the first base material.

7. The base material assembly of claim 1, wherein the first base material and the second base material do not contact each other except through the plurality of emboss members.

8. The base material assembly of claim 1, wherein a through hole of the second base material is located in a center of all of the plurality of emboss members.

9. The base material assembly of claim 1, wherein the plurality of emboss members include:
- a third plurality of emboss members located on a first side of the rivet member and overlapping the rivet member with respect to the transverse direction of the second base material; and
- a fourth plurality of emboss members located on a second side of the rivet member with respect to the transverse direction of the second base material.

10. The base material assembly of claim 1, wherein the plurality of emboss members are spaced apart from each other in the transverse direction and the longitudinal direction of the second base material.

11. The base material assembly of claim 10, wherein the plurality of emboss members are spaced apart from each other to be symmetric with respect to the rivet member coupled to the first base material and the second base material.

12. The base material assembly of claim 11, wherein the plurality of emboss members protrude from the second base material by a predetermined height within an error range.

13. A riveting method of a base material assembly, the riveting method comprising:

preparing a first base material;

preparing a second base material;

forming a plurality of emboss members on the second base material;

spacing apart the first base material from the second base material so that a surface of the first base material faces a surface of the second base material on which the plurality of emboss members are formed;

moving the first base material toward the second base material so that the plurality of emboss members point-contact a plane of the surface of the first base material; and coupling the first base material to the second base material by riveting, wherein the coupling of the first base material and the second base material mechanically and electrically connects the first base material to the second base material through the plurality of emboss members, wherein each of the plurality of emboss members are separately located on the surface of the second base material, wherein each of the plurality of emboss members has a semi-spherical shaped surface contacting the first base material, and wherein the forming the plurality of emboss members include:

forming a first plurality of emboss members surrounding the rivet member with respect to a longitudinal direction of the second base material; and forming a second plurality of emboss members surrounding the rivet member with respect to a transverse direction of the second base material.

14. The riveting method of claim 13, wherein the preparing of the first base material includes forming a first through-hole for receiving the rivet member, wherein the preparing of the second base material includes forming a second through-hole in a location corresponding to the first through-hole for receiving the rivet member, and wherein the plurality of emboss members are spaced apart from the second through-hole in the transverse direction of the second base material and the longitudinal direction of the second base material and protrude from the second base material by a predetermined height.

15. The riveting method of claim 13, further comprising:

after the coupling of the first base material and the second base material, checking a contact state between the plurality of emboss members and the first base material through a space between the first base material and the second base material; and determining whether a defect is generated in the riveting of the first base material and the second base material based on a result obtained by the checking.

* * * * *